(12) United States Patent
Kanbayashi (10) Patent No.: US 7,396,397 B2
(45) Date of Patent: Jul. 8, 2008

(54) INK COMPOSITION FOR OIL-BASED BALLPOINT PEN AND METHOD FOR PRODUCTION THEREOF, AND BALLPOINT PEN REFILL

(75) Inventor: Hironobu Kanbayashi, Isesaki (JP)

(73) Assignee: Kabushiki Kaisha Pilot Corporation, Tokyo (JP)

( * ) Notice: Subject to any disclaimer, the term of this patent is extended or adjusted under 35 U.S.C. 154(b) by 361 days.

(21) Appl. No.: 10/545,076

(22) PCT Filed: Feb. 9, 2004

(86) PCT No.: PCT/JP2004/001328

§ 371 (c)(1),
(2), (4) Date: Aug. 9, 2005

(87) PCT Pub. No.: WO2004/072196

PCT Pub. Date: Aug. 26, 2004

(65) Prior Publication Data

US 2006/0156950 A1    Jul. 20, 2006

(30) Foreign Application Priority Data

Feb. 17, 2003  (WO) .................. PCT/JP03/01636

(51) Int. Cl.
*C09D 11/02*  (2006.01)

(52) U.S. Cl. .................. 106/31.27; 106/31.58
(58) Field of Classification Search ............. 106/31.27, 106/31.58
See application file for complete search history.

(56) References Cited

FOREIGN PATENT DOCUMENTS

| JP | A 2000-256605 | 9/2000 |
|----|---------------|--------|
| JP | A 2001-311032 | 11/2001 |
| JP | A 2003-192975 | 7/2003 |

*Primary Examiner*—Jerry Lorengo
*Assistant Examiner*—Veronica Faison Gee
(74) *Attorney, Agent, or Firm*—Oliff & Berridge, PLC (57) ABSTRACT

In order to obtain an ink for oil-based ballpoint pens and an oil-based ballpoint pen which are excellent in handwriting sharpness, handwriting dryness, handwriting and feeling of writing, an ink composition includes an oil-soluble dye, water, an organic solvent whose vapor pressure at 20° C. is 0.5 mmHg or more and which dissolves the water, and an organic solvent whose vapor pressure at 20° C. is 0.1 mmHg or less and which dissolves the organic solvent whose vapor pressure at 20° C. is 0.5 mmHg or more. A total of these three components is 20 to 75% by mass based on an entire mass of the ink composition. A content of the water is 3.0 to 15.0% by mass based on the entire mass of the ink composition. An ink viscosity at 20° C. is 100 to 5,000 mPa·s. The water and the other components are formulated, mixed and stirred to produce the ink. A ballpoint pen refill with low vapor permeability is used.

11 Claims, 1 Drawing Sheet

FIG.1

INK COMPOSITION FOR OIL-BASED BALLPOINT PEN AND METHOD FOR PRODUCTION THEREOF, AND BALLPOINT PEN REFILL

TECHNICAL FIELD

The present invention relates to an ink composition for oil-based ballpoint pens and a method for production thereof, and a ballpoint pen refill.

BACKGROUND ART

Generally as ballpoint pens, those which have a good feeling of writing, are excellent in handwriting dryness, have no bleeding and no show through in handwriting, are highly sharp in handwriting, chemically stable and have less changes with time are desirable.

In accordance with requests of feeling of writing and handwriting dryness, an ink viscosity at 20° C. is set in the range of 10,000 to 30,000 mPa·s in many of conventional ink compositions for oil-based ballpoint pens. This is higher than the ink viscosity of the ink for water-based ballpoint pens. When the ink viscosity is high in the oil-based ballpoint pen, a ball rotational resistance itself at writing becomes large and the ink condition is very heavy, which is not favorable. On the contrary, when the ink viscosity is excessively lowered, inconveniences that the ink is spilled out and the handwriting dryness worsens occur. Thus, the ink viscosity has been set in the above range.

As a method of enhancing sharpness of the handwriting, a method of increasing an amount of ink to be jetted from a pen nib, a method of increasing a content of a coloring material and the like have been proposed.

However, the ink viscosity of the oil-based ballpoint pen is higher than that of the water-based ballpoint pen, and the amount of ink to be jetted from the pen nib is small. This is because their ink jetting mechanisms are different, i.e., in the ink jetting mechanism of the oil-based ballpoint pen, the handwriting is made by rotating a ball at the pen nib and transferring the ink adhered to the ball onto a writing surface whereas in the ink jetting mechanism of the water-based ballpoint pen, the handwriting is made by migrating the ink onto the writing surface by a capillary/permeation action in the context of the ball rotation at the pen nib.

Therefore, it is not easy to increase the amount of ink to be jetted in the oil-based ballpoint pen compared to the water-based ballpoint pen.

When the method of increasing the content of the coloring material is employed, the inconveniences that ink fluidity is reduced and the ink becomes unstable with time to precipitate the coloring material occur.

When solving the above problems and further improving various required properties, the present inventor has been led to focus on effectiveness of contained water in an ink composition for an oil-based ballpoint pen containing the water.

Recently, ink compositions for oil-based ballpoint pens containing water at a small amount have been proposed. In JP 2000-256605A, an oil-based ballpoint pen ink containing water has been proposed for the purpose of making it difficult to cause unevenness of line density due to directionality when writing with a ballpoint pen. In JP 2001-311032A, an oil-based ballpoint pen ink containing water has been proposed for the purpose of providing the ink whose designed quality is difficult to change, i.e., the ink wherein the ink viscosity is difficult to reduce due to moisture absorption even when the ballpoint pen is stored for a long time, therefore, ink dropping at writing or leakage of ink at a downward tip is unlikely caused.

In the inventions described in these publications, benzyl alcohol and phenyl glycol are used. Benzyl alcohol and phenyl alcohol are well-known as organic solvents with high boiling point, whose vapor pressure is 0.1 mmHg or less.

According to a study by the present inventor, when water and only the organic solvents typified by benzyl alcohol and phenyl glycol with high boiling point, whose vapor pressure is 0.1 mmHg or less were used as the solvents, it has been shown that although dissolution and diffusion of the ink composition other than the solvents can be kept to be stable, an inconvenience occurs when intending to enhance sharpness of the handwriting by increasing the ink amount to be jetted from the pen nib. That is, when intending to enhance sharpness of the handwriting by increasing the ink amount to be jetted from the pen nib, an evaporation rate of the ink transferred on the writing surface becomes slow. Thus, it has been shown that problems such as poor handwriting dryness, bleeding to paper surface and show through occur. Therefore, according to the inventions described in the above publications, it is difficult to enhance the handwriting sharpness without impairing the handwriting dryness and inhibitory properties for the bleeding and the show through.

Furthermore, the present inventor has found after the study that a permeable performance for the paper surface is controlled by containing water at a certain amount or more.

The present inventor has also found that the contained water is effective for facilitation of the evaporation rate of the ink solvent in the handwriting and inhibition of the bleeding and the show through of the handwriting.

Meanwhile, the present inventor has found that the permeable performance of the ink can not be controlled by the contained water and a facilitation effect of the handwriting dryness and inhibitory effects of the bleeding and the show through can not be sufficiently obtained because dissolution stability of the water can not be obtained and the amount of water to be contained can not be increased to an adequate ratio when the water and only the organic solvent with high boiling point, whose vapor pressure is 0.1 mmHg or less are used as the solvents.

A object of the present invention is to provide a chemically stable ink composition for an oil-based ballpoint pen, which exerts effectiveness of contained water for various required properties, is highly sharp in handwriting, excellent in handwriting dryness, has no bleeding and no show through in handwriting and has a good feeling of writing.

DISCLOSURE OF INVENTION

As a result of an extensive study for solving the above object, the present inventor has found to combine positively water, an organic solvent whose vapor pressure at 20° C. is 0.5 mmHg or more and which dissolves the water, and an organic solvent whose vapor pressure at 20° C. is 0.1 mmHg or less and which dissolves the organic solvent whose vapor pressure at 20° C. is 0.5 mmHg or more. This enables to obtain the dissolution stability of the water and increase the water amount to be contained to an adequate ratio. As a result, the handwriting dryness that the solvents in the ink are rapidly evaporated even when a large amount of the ink is jetted on the writing surface is imparted, and also an ink jetting mechanism to permeate the ink into the writing surface, which was not given in the conventional ink for the oil-based ballpoint pen is imparted. These imparted properties make it possible to increase the ink amount to be jetted and enhance the sharpness of the handwriting without impairing the handwriting dryness. Focusing on the above, the present inventor has been led to think of the present invention.

That is, an ink composition for an oil-based ballpoint pen of the present invention is the ink composition for the oil-based ballpoint pen comprising: an oil-soluble dye, and as solvents, water, an organic solvent whose vapor pressure at 20° C. is 0.5 mmHg or more and which dissolves the water, and an organic solvent whose vapor pressure at 20° C. is 0.1 mmHg or less and which dissolves the organic solvent whose vapor pressure at 20° C. is 0.5 mmHg or more, wherein a total of the above water, the organic solvent whose vapor pressure at 20° C. is 0.5 mmHg or more and which dissolves the water, and the organic solvent whose vapor pressure at 20° C. is 0.1 mmHg or less and which dissolves the above organic solvent whose vapor pressure at 20° C. is 0.5 mmHg or more is 20 to 75% by mass based on a total mass of the ink composition as well as a content of the above water is 2.0 to 15.0% by mass based on the total mass of the ink composition.

A first feature of the present invention is to positively add the water into the ink composition for the oil-based ballpoint pen in order to obtain the control of permeable performance of the ink on the paper surface, the facilitating effect on the evaporation rate of the ink solvent in the handwriting and the inhibitory effect on the bleeding and the show through to the paper surface.

The amount of the water in the ink composition for the oil-based ballpoint pen of the invention is 2.0 to 15.0%, and preferably 3.0 to 10.0% by mass based on the total amount of the oil-based ballpoint pen ink of the invention. When the amount of water to be contained is less than 2.0%, the bleeding and the show through to the paper surface occur, and the inhibitory effect on the bleeding and the show through, and the handwriting dryness are not sufficient. When the amount of water to be contained is more than 15%, it exceeds a water-soluble capacity of the ink and causes poor writing.

A second feature is that the solvents which are dissolution media or dispersion media of ink components are composed of the water, the organic solvent whose vapor pressure at 20° C. is 0.5 mmHg or more and which dissolves the water, and the organic solvent whose vapor pressure at 20° C. is 0.1 mmHg or less and which dissolves the above organic solvent whose vapor pressure at 20° C. is 0.5 mmHg or more.

In the combination composed of only the water and the organic solvent whose vapor pressure at 20° C. is 0.5 mmHg or more and which dissolves the water, a large amount of the solvent is evaporated, and a writing performance as the ballpoint pen becomes worse. The dissolution stability of the ink components such as a coloring material is also lacked.

Meanwhile, in the combination composed of only the water and the organic solvent whose vapor pressure at 20° C. is 0.1 mmHg or less and which dissolves the water, the facilitating effect on the ink solvent evaporation in the handwriting, the control of permeable performance on the paper surface and the dissolution stability of the water are not sufficiently obtained.

Furthermore, in combination composed of only the organic solvent whose vapor pressure at 20° C. is 0.5 mmHg or more and which dissolves the water and the organic solvent whose vapor pressure at 20° C. is 0.1 mmHg or less and which dissolves the above organic solvent whose vapor pressure at 20° C. is 0.5 mmHg or more, a permeation inhibitory effect of the ink on the paper surface by the contained water is not obtained. Thus, after the ink migrates onto the paper surface, it becomes difficult to inhibit the permeation of the ink on the paper surface, and the show through and the bleeding easily occur in the hand writing. That is, the inhibitory effect of the show though and the bleeding by the contained water is not obtained. Furthermore, the facilitating effect of the ink solvent evaporation rate in the hand writing by the contained water is not obtained, and the adequate handwriting dryness is not obtained.

Therefore, in the present invention, it is the most important constitution requirement to positively combine three component solvents i.e., the water, the organic solvent whose vapor pressure at 20° C. is 0.5 mmHg or more and which dissolves the water, and the organic solvent whose vapor pressure at 20° C. is 0.1 mmHg or less and which dissolves the above organic solvent whose vapor pressure at 20° C. is 0.5 mmHg or more. A total amount of these three component solvents to be contained is 20.0 to 75.0%, and preferably 35.0 to 65.0% by mass based on an entire mass of the ink composition. When the amount is less than 20.0% by mass, the ink composition is insufficiently dissolved or dispersed, and thus a function as the solvents is not accomplished. When it is more than 75.0% by mass, the handwriting becomes unclear because a solvent formulation ratio is high, and control of a permeable performance becomes difficult, and the bleeding and the show through can not prevented.

The organic solvent whose vapor pressure at 20° C. is 0.5 mmHg or more and which dissolves the water is the important solvent capable of keeping stability of the water which is an aforementioned active component in the ink. This organic solvent organically links with the contained water to ably exert the handwriting dryness and the permeable effect on the paper surface, and even when the amount of the ink to be jetted is increased, the handwriting dryness is good and no show through and no bleeding occur.

When the amount of the organic solvent whose vapor pressure at 20° C. is 0.5 mmHg or more and which dissolves the water is less than 3.0% by mass based on the entire ink composition, the amount of the ink solvents to be evaporated in the handwriting is not sufficient, it is difficult to obtain the permeable effect on the paper surface and dissolution stability of the water, and when it is more than 30.0% by mass, the ink stability is poor because the evaporation amount of the solvents is too large, and when the ballpoint pen is left stand for a long time with cap off, poor writing such as write trouble is likely to occur. Thus, the amount of 3.0 to 30.0% by mass is preferable.

The organic solvent whose vapor pressure at 20° C. is 0.5 mmHg or more and which dissolves the water is not particularly limited, and considering the dissolution stability of the water, glycol ethers or alcohols are preferable. Glycol ethers include ethylene glycol monomethyl ether, ethylene glycol monoethyl ether, ethylene glycol monobutyl ether, ethylene glycol dimethyl ether, propylene glycol monomethyl ether, propylene glycol monoethyl ether, diethylene glycol dimethyl ether, ethylene glycol monoisopropyl ether, ethylene glycol monoisobutyl ether, propylene glycol monopropyl glycol, and the like. Alcohols include methanol, ethanol, 1-propanol, 2-propanol, t-butanol, propargyl alcohol, allyl alcohol, 3-methyl-1-butine-3-ol, ethylene glycol monomethyl ether acetate and the like. These organic solvents may be used alone or in mixture of two or more.

For stabilizing the dissolution or dispersion of the composition for oil-based ballpoint pens, it is also necessary to employ the solvent whose vapor pressure at 20° C. is 0.1 mmHg or less and which dissolves the organic solvent whose vapor pressure at 20° C. is 0.5 mmHg or more. When the amount of the solvent whose vapor pressure at 20° C. is 0.1 mmHg or less and which dissolves the organic solvent whose vapor pressure at 20° C. is 0.5 mmHg or more is less than 10.0% by mass based on the entire amount of the ink composition, it is difficult to stably maintain the dissolution or dispersion of the ink components whereas when its amount is more than 40.0% by mass, the handwriting dryness is reduced because solvent evaporation becomes slow. The control of the permeable performance onto the paper surface becomes difficult, and thus, the handwriting bleeding and the show through occur in some cases. Therefore, it is desirable that its amount is 10.0 to 40.0%, and more preferably 20.0 to 30.0% by mass based on the entire amount of the ink composition.

As the solvent whose vapor pressure at 20° C. is 0.1 mmHg or less and which dissolves the organic solvent whose vapor pressure at 20° C. is 0.5 mmHg or more, it is possible to use alcohols and glycols such as benzyl alcohol, diethylene glycol and polyethylene glycol, and glycol ethers such as ethylene glycol monophenyl ether. These may be used alone or in mixture of two or more.

In the present invention, an oil-soluble dye which has good coloring property and good stability in the ink is used as a coloring material. The oil-soluble dye is not particularly limited, and it is possible to use all oil-soluble dyes generally used for the inks for the oil-based ballpoint pens. The oil-soluble dyes may be those solubilized or microcapsulated, and include Valifast color, Orient oil color (Orient Chemical Industries Ltd.), Aizen Spilon dye, Aizen SOT dye (Hodogaya Chemical Co., Ltd.). These oil-soluble dyes may be used alone or in appropriate combination of two or more. By the use of the oil-soluble dye as the coloring material, chemical stability of the ink can be maintained most suitably, and the structure of the ballpoint pen is not restricted because cap-off property is also excellent. Since the oil-soluble dye is completely dissolved in the ink, it is extremely chemically stable, ball rotation at the pen nib is not inhibited and lubricative property is good. By such a technical context, it becomes possible to apply the maximum amount to be added, and when sharpness of the handwriting is demanded overwhelmingly, employment of the oil-soluble dye is the most effective choice. Furthermore, by employing the oil-soluble dye, the selection range of the solvents extends, and it becomes easy to control the handwriting dryness, the show through and the bleeding. The amount of the oil-soluble dye to be added is not particularly limited, but when the amount is less than 5.0% by mass, it is difficult to obtain the desired sharpness of the handwriting whereas when the amount is more than 50% by mass, ink fluidity worsens and is prone to become instable with time. Thus the amount of 5.0 to 50.0% by mass based on the entire amount of the ink composition for oil-based ballpoint pens is desirable.

An ink viscosity of the oil-based ink composition of the present invention is not particularly limited, but when the ink viscosity at 20° C. is less than 100 mPa·s, the bleeding and the show through easily occur, the lubricative property at strong pen pressure is low, the pen nib is easily worn and poor writing occurs in some cases. When the ink viscosity at 20° C. is more than 5,000 mPa·s, ball rotation resistance at writing becomes large and the feeling of writing is prone to become heavy when used as the ballpoint pen. When the ink is excessively discharged, the permeable effect of the ink on the writing surface becomes small, and thus the handwriting dryness easily worsens. Therefore, it is preferable that the ink viscosity at 20° C. is 100 to 5,000 mPa·s If desired, an ink viscosity modifier may be added. The ink viscosity modifier includes phenol resins, mallein resins, amide resins, xylene resins, hydrogenated rosin resins, ketone resins, terpene resins, butyral resins and the like. These may be used alone or in mixture of two or more.

In order to improve ink blobbing at writing, a spinnability-providing agent may be added if desired. The spinnability-providing agent includes polyvinyl pyrrolidone, polyethylene oxide, hydroxypropylcellulose, rubber based polymer compounds, and the like. These may be used alone or in combination.

As the other additives, a surfactant, an antirust, a dispersant, a lubricant, a dye dissolution stabilizer and the like can be appropriately selected and used. In order to obtain the good feeling of writing, phosphate ester type surfactants may be added, but the phosphate ester type surfactant easily reacts with the dye, and the ink stability with time is likely to be inhibited. Thus, it is preferable not to add.

It is preferable that the ink composition for oil-based ballpoint pens of the present invention is produced by initially formulating the components composed of the ink composition of the invention at desired ratios within the above conditions, mixing and stirring them. It is preferable to manage not to change the composition by avoiding the evaporation of the formulated water and absorption of vapor from an atmosphere into the ink composition, and the evaporation of the other solvents in this production process and thereafter. This enables to certainly produce the present invention in which the water acts effectively and utilize for a long time as possible with keeping its effectiveness.

Theoretically, it is possible to obtain the ink composition of the present invention by absorbing the water from the atmosphere in some cases, but the production and the management are difficult. Thus, it is possible to certainly constitute and utilize the ink composition of the invention by producing by also formulating the water which is the active component of the invention when the components other than the water are formulated, and storing with no composition change.

More preferably, the ink composition is produced by mixing the above oil-soluble dye with the solvent whose vapor pressure at 20° C. is 0.1 mmHg or less and which dissolves the organic solvent whose vapor pressure at 20° C. is 0.5 mmHg or more and stirring at relatively high temperature, then mixing the above water and the organic solvent whose vapor pressure at 20° C. is 0.5 mmHg or more and which dissolves the water to the resulting mixture and stirring at relatively low temperature. This enables to efficiently dissolve respective components with inhibiting the absorption of the water and the evaporation of the water and the other solvents.

When the ink composition for oil-based ballpoint pens of the present invention is utilized for the ballpoint pen, it is preferable to accept the ink composition of the invention in a case with a pen nib at which permeability of water and the like is low not so as to cause the composition change.

Specifically, a ballpoint pen refill where the ink composition for oil-based ballpoint pens of the present invention is filled into an ink accommodating tube loaded with a ballpoint pen tip at a top end, and an ink following member is loaded at a back end of the ink composition for oil-based ballpoint pens is used.

As a constitutive material of the ink accommodating tube, it is possible to use various materials such as metallic materials and resin materials. It is desirable to reduce vapor permeability at a side wall of the ink accommodating tube by the use of the material whose vapor permeability is minimized.

It is preferable that the vapor permeability at the side wall of the ink accommodating tube is 2.0 g/m$^2$·24 hr at 25° C. and 90% RH, and more preferably 1.0 g/m$^2$·24 hr. It is effective to use the metallic material with high blockage. It is possible to obtain the sufficient blockage by using the resin material whose vapor permeability is 2.0 g/m²·24 hr or less at 25° C. and 90% RH at a thickness of 25 µm, at a thickness of 50 µm or more.

BEST MODE FOR CARRYING OUT THE INVENTION

First, Examples of the present invention are described with reference to Tables 1 to 4.

EXAMPLE 1

For an ink composition for oil-based ballpoint pens in Example 1, benzyl alcohol as an organic solvent whose vapor pressure is 0.1 mmHg or less (20° C.), oleic acid as a fatty acid which is a lubricant enhancer, polyvinyl pyrrolidone K-90 (supplied from Woko Pure Chemical Industries Ltd.) as a spinnability-providing agent, Hilac 110H (supplied from Hitachi Chemical Co., Ltd) as an ink viscosity modifier, and oil-soluble dyes of Spilon Black GMH-Special (suppled from Hodogaya Chemical Co., Ltd.) and Valifast Violet 1701 (supplied from Oriental Chemical Industry Ltd.) as coloring materials were mixed, and stirred at 60° C. for 6 hours using a Disper stirrer. Then, propylene glycol monoethyl ether as an organic solvent whose vapor pressure was 0.5 mmHg or more (20° C.), water and Hilac 110H (supplied from Hitachi Chemical Co., Ltd, ketone resin) were mixed with the resulting mixture, and stirred at 30° C. for 2 hours using the Disper stirrer to obtain the black ink composition for ballpoint pens. Specific amounts to be formulated are as shown below. An ink viscosity of the ink composition for oil-based ballpoint pens measured at a rotation frequency of 10 rpm using a B type viscometer (supplied from Tokyo Keiki Co., Ltd.) was 900 mPa·s.

| | |
|---|---|
| Organic solvent (vapor pressure 0.1 mmHg or less, 20° C.) (benzyl alcohol) | 26.0% by mass |
| Organic solvent (vapor pressure 0.5 mmHg or more, 20° C.) (propylene glycol monoethyl ether) | 23.5% by mass |
| Coloring material (Spilon Black GMH-Special) | 19.0% by mass |
| Coloring material (Valifast Violet 1701) | 19.0% by mass |
| Water | 3.0% by mass |
| Lubricant (oleic acid) | 2.0% by mass |
| Ink viscosity modifier (Hilac 110H) | 7.0% by mass |
| Spinnability-providing agent (polyvinyl pyrrolidone K-90) | 0.5% by mass |

EXAMPLE 2

An ink composition for oil-based ballpoint pens was obtained by the same way as in Example 1 except that respective components of the ink composition for oil-based ballpoint pens were formulated as shown in Table 1. A measured result of the ink viscosity is as shown in Table 1.

EXAMPLE 3

An ink composition for oil-based ballpoint pens was obtained by the same way as in Example 1 except that ethylene glycol monobutyl ether in place of propylene glycol monoethyl ether was used as an organic solvent whose vapor pressure was 0.5 mmHg or more (20° C.) and respective components of the ink composition for oil-based ballpoint pens were formulated as shown in Table 1. A measured result of the ink viscosity is as shown in Table 1.

EXAMPLE 4

An ink composition for oil-based ballpoint pens was obtained by the same way as in Example 1 except that ethylene glycol monophenyl ether in place of benzyl alcohol was used as an organic solvent whose vapor pressure was 0.1 mmHg or less (20° C.) and respective components of the ink composition for oil-based ballpoint pens were formulated as shown in Table 2. A measured result of the ink viscosity is as shown in Table 2.

EXAMPLE 5

An ink composition for oil-based ballpoint pens with a viscosity of 100 mPa·s was obtained by the same way as in Example 1 except that Hilac 110H which was an ink viscosity modifier was not added and respective components of the ink composition for oil-based ballpoint pens were formulated as shown in Table 2.

EXAMPLE 6

An ink composition for oil-based ballpoint pens with a viscosity of 7000 mPa·s was obtained by the same way as in Example 1 except that respective components of the ink composition for oil-based ballpoint pens were formulated as shown in Table 2.

EXAMPLE 7

An ink composition for oil-based ballpoint pens was obtained by the same way as in Example 1 except that ethylene glycol monophenyl ether in place of benzyl alcohol was used as the organic solvent whose vapor pressure was 0.1 mmHg or less (20° C.), ethylene glycol monobutyl ether and 1-propanol in place of propylene glycol monoethyl ether were used as the organic solvent whose vapor pressure was 0.5 mmHg or more (20° C.) and respective components of the ink composition for oil-based ballpoint pens were formulated as shown in Table 3. A measured result of the ink viscosity is as shown in Table 3.

EXAMPLES 8 and 9

An ink composition for oil-based ballpoint pens was obtained by the same way as in Example 1 except that respective components of the ink composition for oil-based ballpoint pens were formulated as shown in Table 3. A measured result of the ink viscosity is as shown in Table 3.

EXAMPLES 10 to 12

An ink composition for oil-based ballpoint pens was obtained by the same way as in Example 1 except that benzyl alcohol and diethylene glycol were used as the organic solvent whose vapor pressure was 0.1 mmHg or less (20° C.) and respective components of the ink composition for oil-based ballpoint pens were formulated as shown in Table 4. A measured result of the ink viscosity is as shown in Table 4.

TABLE 1

Formulated component ratios (% by mass), measured values of ink viscosity and evaluation results of various properties in Examples 1 to 3 of the present invention

| FORMULATED COMPONENT | | EXAMPLE 1 | EXAMPLE 2 | EXAMPLE 3 |
|---|---|---|---|---|
| COLORING AGENT | SPILON BLACK GMH-S | 19.0 | 19.0 | 19.0 |
| | VALIFAST VIOLET 1701 | 19.0 | 19.0 | 19.0 |
| ORGANIC ACID | OLEIC ACID | 2.0 | 2.0 | 2.0 |
| SPINNABILITY-PROVIDING AGENT | PVP K-90 | 0.5 | 0.5 | 0.5 |
| VISCOSITY MODIFIER | HILAC 110H | 7.0 | 6.0 | 6.0 |
| ORGANIC SOLVENT 1, VAPOR PRESSURE 0.1 OR LESS (20° C.) | BENZYL ALCOHOL ETHYLENE GLYCOL MONOPHENYL ETHER 0.01 | 26.0 | 20.0 | 25.5 |
| ORGANIC SOLVENT 2, VAPOR PRESSURE 0.5 OR MORE (20° C.) | PROPYLENE GLYCOL MONOETHYL ETHER 4.0 ETHYLENE GLYCOL MONOBUTYL ETHER 0.6 1-PROPANOL 20.0 | 23.5 | 18.5 | 23.0 |
| WATER | H$_2$O | 3.0 | 15.0 | 5.0 |
| TOTAL OF 3 SOLVENT COMPONENTS | | 52.5 | 53.5 | 53.5 |
| INK VISCOSITY (mPa · s) | | 900 | 1000 | 1000 |
| WATER DISSOLUTION STABILITY | | ○ | ○ | ○ |
| HANDWRITING DRYNESS | | ○ | ○ | ○ |
| HANDWRITING SHARPNESS | | ○ | ○ | ○ |
| BLEEDING | | ◎ | ◎ | ◎ |
| SHOW THROUGH | | ◎ | ◎ | ◎ |
| WRITING FEEL | | ◎ | ◎ | ◎ |

TABLE 2

Formulated component ratios (% by mass), measured values of ink viscosity and evaluation results of various properties in Examples 4 to 6 of the present invention

| FORMULATED COMPONENT | | EXAMPLE 4 | EXAMPLE 5 | EXAMPLE 6 |
|---|---|---|---|---|
| COLORING AGENT | SPILON BLACK GMH-S | 19.0 | 16.0 | 20.0 |
| | VALIFAST VIOLET 1701 | 19.0 | 16.0 | 20.0 |
| ORGANIC ACID | OLEIC ACID | 2.0 | 2.0 | 2.0 |
| SPINNABILITY-PROVIDING AGENT | PVP K-90 | 0.5 | 0.5 | 0.5 |
| VISCOSITY MODIFIER | HILAC 110H | 6.0 | | 18.5 |
| ORGANIC SOLVENT 1, VAPOR PRESSURE 0.1 OR LESS (20° C.) | BENZYL ALCOHOL ETHYLENE GLYCOL MONOPHENYL ETHER 0.01 | 25.5 | 31.5 | 17.0 |
| ORGANIC SOLVENT 2, VAPOR PRESSURE 0.5 OR MORE (20° C.) | PROPYLENE GLYCOL MONOETHYL ETHER 4.0 ETHYLENE GLYCOL MONOBUTYL ETHER 0.6 1-PROPANOL 20.0 | 23.0 | 29.0 | 17.0 |
| WATER | H$_2$O | 5.0 | 5.0 | 5.0 |
| TOTAL OF 3 SOLVENT COMPONENTS | | 53.5 | 65.5 | 39.0 |
| INK VISCOSITY (mPa · s) | | 1500 | 100 | 7000 |
| WATER DISSOLUTION STABILITY | | ○ | ○ | ○ |
| HANDWRITING DRYNESS | | ○ | ○ | ○ |
| HANDWRITING SHARPNESS | | ○ | ○ | ○ |
| BLEEDING | | ○ | ○ | ◎ |
| SHOW THROUGH | | ◎ | ○ | ◎ |
| WRITING FEEL | | ◎ | ◎ | ○ |

TABLE 3

Formulated component ratios (% by mass), measured values of ink viscosity and evaluation results of various properties in Examples 7 to 9 of the present invention

| FORMULATED COMPONENT | | EXAMPLE 7 | EXAMPLE 8 | EXAMPLE 9 |
|---|---|---|---|---|
| COLORING AGENT | SPILON BLACK GMH-S | 19.0 | 19.0 | 19.0 |
| | VALIFAST VIOLET 1701 | 19.0 | 19.0 | 19.0 |
| ORGANIC ACID | OLEIC ACID | 2.0 | 2.0 | 2.0 |
| SPINNABILITY-PROVIDING AGENT | PVP K-90 | 0.5 | 0.5 | 0.5 |
| VISCOSITY MODIFIER | HILAC 110H | 6.0 | 15.5 | 9.0 |
| ORGANIC SOLVENT 1, VAPOR PRESSURE 0.1 OR LESS (20° C.) | BENZYL ALCOHOL | | 20.0 | 23.5 |
| | ETHYLENE GLYCOL MONOPHENYL ETHER 0.01 | 26.5 | | |
| ORGANIC SOLVENT 2, VAPOR PRESSURE 0.5 OR MORE (20° C.) | PROPYLENE GLYCOL MONOETHYL ETHER 4.0 | | 19.0 | 22.0 |
| | ETHYLENE GLYCOL MONOBUTYL ETHER 0.6 | 11.0 | | |
| | 1-PROPANOL 20.0 | 11.0 | | |
| WATER | H$_2$O | 5.0 | 5.0 | 5.0 |
| TOTAL OF 3 SOLVENT COMPONENTS | | 53.5 | 44.0 | 50.5 |
| INK VISCOSITY (mPa · s) | | 1500 | 4700 | 2500 |
| WATER DISSOLUTION STABILITY | | ○ | ○ | ○ |
| HANDWRITING DRYNESS | | ○ | ○ | ○ |
| HANDWRITING SHARPNESS | | ○ | ○ | ○ |
| BLEEDING | | ◎ | ◎ | ◎ |
| SHOW THROUGH | | ◎ | ◎ | ◎ |
| WRITING FEEL | | ◎ | ○ | ◎ |

TABLE 4

Formulated component ratios (% by mass), measured values of ink viscosity and evaluation results of various properties in Examples 10 to 12 of the present invention

| FORMULATED COMPONENT | | EXAMPLE 10 | EXAMPLE 11 | EXAMPLE 12 |
|---|---|---|---|---|
| COLORING AGENT | SPILON BLACK GMH-S | 19.0 | 19.0 | 19.0 |
| | VALIFAST VIOLET 1701 | 19.0 | 19.0 | 19.0 |
| ORGANIC ACID | OLEIC ACID | 2.0 | 2.0 | 2.0 |
| SPINNABILITY-PROVIDING AGENT | PVP K-90 | 0.5 | 0.5 | 0.5 |
| VISCOSITY MODIFIER | HILAC 110H | 7.0 | 6.0 | 6.0 |
| ORGANIC SOLVENT 1, VAPOR PRESSURE 0.1 OR LESS (20° C.) | BENZYL ALCOHOL | 33.0 | 28.0 | 25.0 |
| | ETHYLENE GLYCOL MONOPHENYL ETHER 0.01 | 5.0 | 7.0 | 3.0 |
| ORGANIC SOLVENT 2, VAPOR PRESSURE 0.5 OR MORE (20° C.) | PROPYLENE GLYCOL MONOETHYL ETHER 4.0 | 9.5 | | 10.0 |
| | ETHYLENE GLYCOL MONOBUTYL ETHER 0.6 | | 13.5 | 7.5 |
| | 1-PROPANOL 20.0 | | | |
| WATER | H$_2$O | 5.0 | 5.0 | 8.0 |
| TOTAL OF 3 SOLVENT COMPONENTS | | 52.5 | 53.5 | 53.5 |
| INK VISCOSITY (mPa · s) | | 1500 | 1300 | 800 |
| WATER DISSOLUTION STABILITY | | ○ | ○ | ○ |
| HANDWRITING DRYNESS | | ○ | ○ | ○ |
| HANDWRITING SHARPNESS | | ○ | ○ | ○ |
| BLEEDING | | ◎ | ◎ | ◎ |
| SHOW THROUGH | | ◎ | ◎ | ◎ |
| WRITING FEEL | | ◎ | ◎ | ◎ |

Next, in order to show technical significance of the present invention, Comparative Examples will be described with reference to Tables 5 and 6.

COMPARATIVE EXAMPLE 1

An ink composition for oil-based ballpoint pens was obtained by the same way as in Example 1 except that an organic solvent whose vapor pressure at 20° C. was 0.5 mmHg or more was not formulated and respective components of the ink composition for oil-based ballpoint pens were formulated as shown in Table 5.

COMPARATIVE EXAMPLES 2 and 3

An ink composition for oil-based ballpoint pens was obtained by the same way as in Example 1 except that respective components of the ink composition for oil-based ballpoint pens were formulated as shown in Table 5.

COMPARATIVE EXAMPLE 4

An ink composition for oil-based ballpoint pens was obtained by the same way as in Example 1 except that an organic solvent whose vapor pressure at 20° C. was 0.1 mmHg or less was not formulated and respective components of the ink composition for oil-based ballpoint pens were formulated as shown in Table 5.

COMPARATIVE EXAMPLE 5

An ink composition for oil-based ballpoint pens was obtained by the same way as in Example 1 except that respective components of the ink composition for oil-based ballpoint pens were formulated as shown in Table 6.

COMPARATIVE EXAMPLE 6

An ink composition for oil-based ballpoint pens was obtained by the same way as in Example 1 except that respective components of the ink composition for oil-based ballpoint pens were formulated as shown in Table 6.

COMPARATIVE EXAMPLE 7

An ink composition for oil-based ballpoint pens was obtained by the same way as in Example 1 except that a dye and a pigment were combined as coloring materials, polyvinyl butyral was used as a dispersant of the pigment and respective components of the ink composition for oil-based ballpoint pens were formulated as shown in Table 6.

COMPARATIVE EXAMPLE 8

An ink composition for oil-based ballpoint pens was obtained by the same way as in Example 1 except that not the dye but the pigment was combined as the coloring material, polyvinyl butyral was used as the dispersant of the pigment and respective components of the ink composition for oil-based ballpoint pens were formulated as shown in Table 6.

Measured results of the ink viscosity in respective Comparative Examples were as shown in Tables 5 and 6.

TABLE 5

Formulated component ratios (% by mass), measured values of ink viscosity and evaluation results of various properties in Comparative Examples 1 to 4.

| FORMULATED COMPONENT | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| COLORING AGENT | SPILON BLACK GMH-S | 19.0 | 19.0 | 19.0 | 19.0 |
| | VALIFAST VIOLET 1701 | 19.0 | 19.0 | 19.0 | 19.0 |
| | CARBON BLACK (PIGMENT) | | | | |
| ORGANIC ACID | OLEIC ACID | 2.0 | 2.0 | 2.0 | 2.0 |
| SPINNABILITY-PROVIDING AGENT | PVP K-90 | 0.5 | 0.5 | 0.5 | 0.5 |
| VISCOSITY MODIFIER | HILAC 110H | 6.0 | 6.0 | 6.0 | 6.0 |
| DISPERSANT | POLYVINYL BUTYRAL | | | | |
| ORGANIC SOLVENT 1, VAPOR PRESSURE 0.1 OR LESS (20° C.) | BENZYL ALCOHOL | 48.5 | 27.5 | 18.5 | |
| ORGANIC SOLVENT 2, VAPOR PRESSURE 0.5 OR MORE (20° C.) | PROPYLENE GLYCOL MONOETHYL ETHER 4.0 | | 25.0 | 15.0 | 25.5 |
| | ETHYLENE GLYCOL MONOMETHYL | | | | 23.0 |

TABLE 5-continued

Formulated component ratios (% by mass), measured values of ink viscosity and evaluation results of various properties in Comparative Examples 1 to 4.

| FORMULATED COMPONENT | | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|
| | ETHER 6.2 | | | | |
| WATER | $H_2O$ | 5.0 | 1.0 | 20.0 | 5.0 |
| TOTAL OF 3 SOLVENT COMPONENTS | | 53.5 | 53.5 | 53.5 | 53.5 |
| INK VISCOSITY (mPa · s) | | 1500 | 1500 | 600 | — |
| WATER DISSOLUTION STABILITY | | X | ○ | X | — |
| HANDWRITING DRYNESS | | — | Δ | — | — |
| HANDWRITING SHARPNESS | | — | ○ | — | — |
| BLEEDING | | — | Δ | — | — |
| SHOW THROUGH | | — | Δ~X | — | — |
| WRITING FEEL | | — | ◎ | — | — |

TABLE 6

Formulated component ratios (% by mass), measured values of ink viscosity and evaluation results of various properties in Comparative Examples 5 to 8.

| FORMULATED COMPONENT | | COMPARATIVE EXAMPLE 5 | COMPARATIVE EXAMPLE 6 | COMPARATIVE EXAMPLE 7 | COMPARATIVE EXAMPLE 8 |
|---|---|---|---|---|---|
| COLORING AGENT | SPILON BLACK GMH-S | 8.0 | 20.0 | 18.5 | |
| | VALIFAST VIOLET 1701 | 7.5 | 20.0 | 18.5 | |
| | CARBON BLACK (PIGMENT) | | | 5.0 | 20.0 |
| ORGANIC ACID | OLEIC ACID | 2.0 | 2.0 | | |
| SPINNABILITY-PROVIDING AGENT | PVP K-90 | 0.5 | 0.5 | 0.5 | 0.5 |
| VISCOSITY MODIFIER | HILAC 110H | | 39.5 | 10.0 | 10.0 |
| DISPERSANT | POLYVINYL BUTYRAL | | | 12.0 | 15.0 |
| ORGANIC SOLVENT 1, VAPOR PRESSURE 0.1 OR LESS (20° C.) | BENZYL ALCOHOL | 37.0 | 7.5 | 17.5 | 42.0 |
| ORGANIC SOLVENT 2, VAPOR PRESSURE 0.5 OR MORE (20° C.) | PROPYLENE GLYCOL MONOETHYL ETHER 4.0 ETHYLENE GLYCOL MONOMETHYL ETHER 6.2 | 35.0 | 7.5 | 15.0 | 7.5 |
| WATER | $H_2O$ | 10.0 | 3.0 | 3.0 | 5.0 |
| TOTAL OF 3 SOLVENT COMPONENTS | | 82.0 | 18.0 | 35.5 | 54.5 |
| INK VISCOSITY (mPa · s) | | 40 | — | 2800 | 1800 |
| WATER DISSOLUTION STABILITY | | ○ | — | ○ | Δ |
| HANDWRITING DRYNESS | | ○ | — | ○ | ○ |
| HANDWRITING SHARPNESS | | X | — | X | X |
| BLEEDING | | Δ~X | — | ○ | ○ |
| SHOW THROUGH | | Δ~X | — | ○ | ○ |
| WRITING FEEL | | ○ | — | X | X |

Test Methods and Evaluations

The ink compositions for oil-based ballpoint pens in Examples 1 to 12 or Comparative Examples 2, 5, 7 or 8 were filled into an ink accommodating tube of a ballpoint pen refill, and the ballpoint pen refill was housed in a shaft holder of a ballpoint pen to make a ballpoint pen. Then the following tests were carried out and evaluated.

Figure 1:
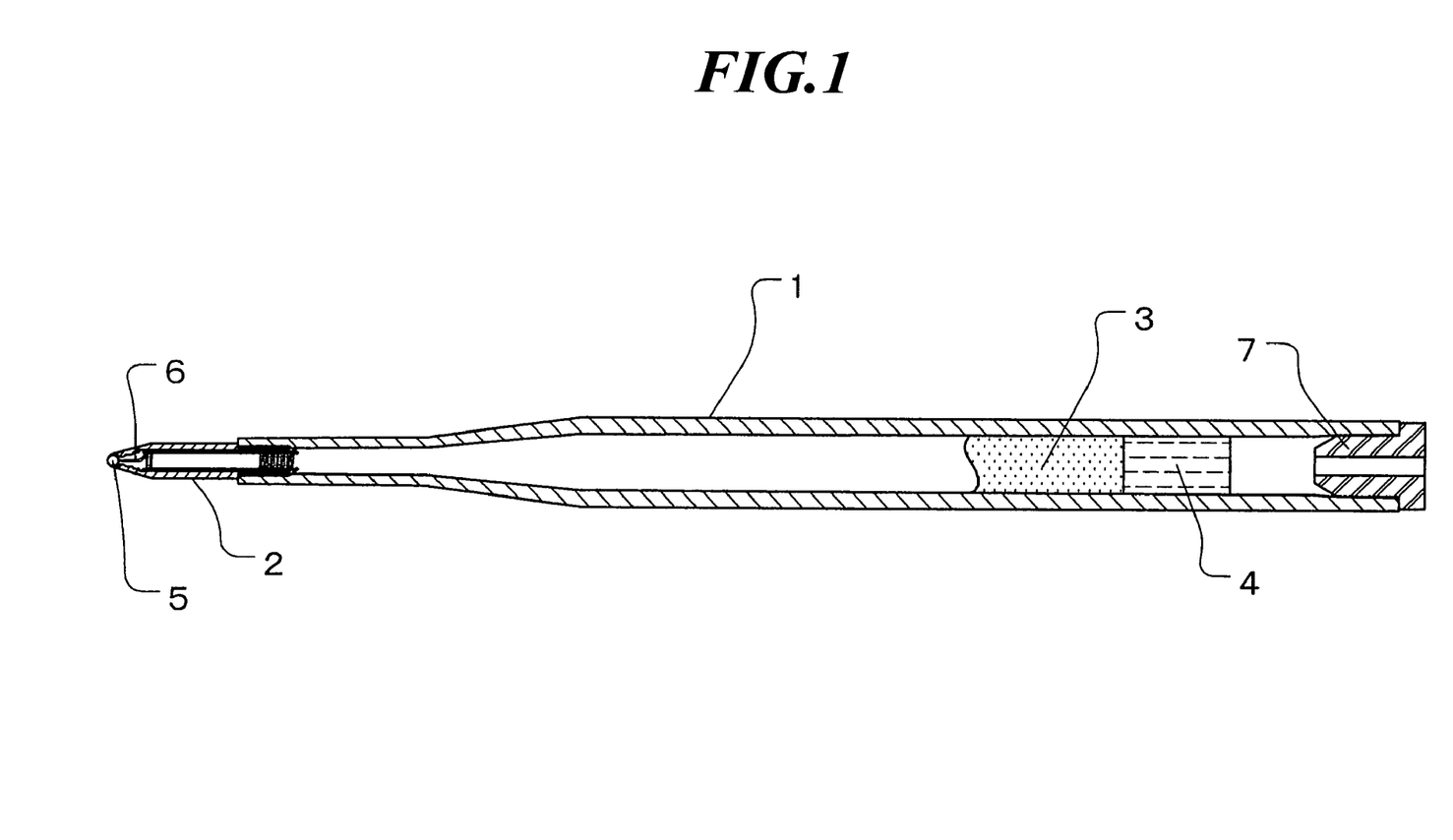
FIG. 1 is a sectional view of a ballpoint pen refill in an embodiment of the present invention.

As the ballpoint pen refill, as shown in FIG. 1, a PP material (vapor permeability is 1.6 g/m²·24 hr at 25° C. and 90% RH at a thickness of 25 μm) whose average thickness at an ink accepting section was 75 μm and water permeability was low was used for the ink accommodating tube 1, a ballpoint pen tip 2 was loaded at a top end of this ink accommodating tube, and a part was omitted in the figure, but the ink composition 3 for oil-based ballpoint pens of the present invention was directly filled inside and a grease-shaped ink following member 4 was directly filled at a back end of the ink composition for oil-based ballpoint pens.

It is necessary to minimize moisture absorption with time because increase of water content by the moisture absorption with time is likely to cause damage of an initial performance as the ballpoint pen refill. Majority of the water absorption with time occurs in a contacting section of the ink composition for oil-based ballpoint pens with air. Thus, it is possible to minimize the change of the amount of contained water in the production and thereafter by filling the grease-shaped ink following member 4 with extremely low water permeability at the back end of the ink composition for oil-based ballpoint pens to lose the contacting section of the ink composition 3 for oil-based ballpoint pens with air. The ink following member 4 also blocks the evaporation of the organic solvents in the ink composition 3.

It is preferable that a metallic material such as aluminium, brass and stainless or a resin material whose vapor permeability is 2.0 g/m$^2$·24 hr or less at 25° C. and 90% RH at a thickness of 25 μm is used for the ink accommodating tube 1.

When the vapor permeability is more than 2.0 g/m$^2$·24 hr in the resin material, water in the air permeates the resin under an atmosphere at high humidity and it becomes difficult to keep the water content in the ink composition. It is also preferable to exert more excellent permeability blockade by making the thickness of the material whose vapor permeability is 2.0 g/m$^2$·24 hr or less at 25° C. and 90% RH at a thickness of 25 μm 50 μm or making the vapor permeability at 25° C. and 90% RH at a thickness of 25 μm 1.0 g/m$^2$·24 hr or less.

The material of the ink accommodating tube 1 can be formed from at least one selected from those having the above property in polypropylene, polyethylene (density=0.955), polytetrafluoroethylene and the like, and considering ink resistance and molding property, the PP material is the most preferable.

As the grease-like ink following member 4, it is possible to use by appropriately selecting the conventionally known grease-shaped ink following member 4 used for pens and pencils, obtained by using one selected from hardly volatile organic liquids or non-volatile liquids, specifically silicone oil, polybutene, mineral oil, animal or plant oil, liquid paraffin and the like as a base oil and appropriately adding a thickener, a plasticizer, resins and the like.

More preferably, a valve mechanism is comprised to let out the ink by pressing a ball 5 rotatably harbored at the top end of the ballpoint pen to an inner wall of a tip front edge by a coil spring 6 directly or through a pressing body, and giving space between the ball and the inner wall of the tip front edge by a pressing force at writing, and the fine space at the tip front is closed when not used.

The water amount in the oil-based ink composition can be measured by appropriately selecting the method generally used, e.g., Karl Fischer moisture meter (supplied from Hiranuma Sangyo Co., Ltd.).

| (1) Water dissolution stability | |
|---|---|
| Good | ○ |
| Slightly inferior | Δ |

| -continued | |
|---|---|
| Inferior | X |
| (2) Handwriting dryness: when paper is contacted with press of 500 gf for one minutes immediately after writing | |
| No transfer | ○ |
| Transfer is observed but practically no problem | Δ |
| Transfer is observed and practically problematic | X |
| (3) Handwriting sharpness | |
| Ink colors are bright and handwriting is sharp | ○ |
| Ink colors are thin and handwriting is not sharp | X |
| (4) Bleeding: bleeding after writing was observed | |
| No occurrence at all | ◎ |
| Practically no problem | ○ |
| Practically slightly problematic | Δ |
| Practically problematic | X |
| (5) Show through: a backside of the paper after writing was observed. | |
| No occurrence at all | ◎ |
| Practically no problem | ○ |
| Practically slightly problematic | Δ |
| Practically problematic | X |
| (6) Writing feel: a sensory analysis of those written by hand was performed and evaluated. | |
| Smooth and good | ◎ |
| Slightly inferior | ○ |
| Highly inferior | X |

Evaluation results of respective Examples and Comparative Examples are as shown in the above tables.

Comparative Example 1 was excluded from the evaluation because the water dissolution stability was lacked and the ink was not stable because only water and the solvent whose vapor pressure at 20° C. was 0.1 mmHg or less were used as the solvents.

In Comparative Example 2, not only control of the solvent evaporation after writing was insufficient and the handwriting dryness did not become good, but also the permeable performance into the paper could not be controlled and the handwriting bleeding and show through did not become good because the amount of added water was small.

Comparative Example 3 was excluded from the evaluation because the water dissolution stability in the ink was impaired and the water stability did not become good due to the large amount of the added water.

In Comparative Example 4, since only the solvent whose vapor pressure at 20° C. was 0.5 mmHg or more was used, the ink composition did not dissolved and the sufficient ink for ballpoint pens was not made.

In Comparative Example 5, since the total of three solvent components (water, organic solvent of 0.1 mmHg or less, organic solvent of 0.5 mmHg or more) was more than 75%, the handwriting sharpness was lacked. The solvent formulation ratios were excessively high, therefore, the permeable performance into the paper could not be controlled and the handwriting bleeding and show through became remarkable.

In Comparative Example 6, since the total of three solvent components (water, organic solvent of 0.1 mmHg or less, organic solvent of 0.5 mmHg or more) was less than 20%, the ink composition did not dissolved and the sufficient ink for ballpoint pens was not made.

In Comparative Example 7, not only the pigment is insufficiently dispersed in the ink because the pigment was combined as the coloring material and thus the handwriting sharpness was insufficient due to the insufficient amount of jetted ink, but also the good handwriting was not obtained due to insufficient rotation of the ball. The stability with time was also inferior.

In Comparative Example 8, not only the handwriting sharpness was insufficient because the pigment alone was employed as the coloring material, but also the good handwriting was not obtained due to insufficient rotation of the ball. The stability with time was also inferior.

As is shown from the results in Comparative Examples 7 and 8, it is important not to contain the pigment in the ink composition for oil-based ballpoint pens of the present invention.

INDUSTRIAL APPLICABILITY

As described above in detail, according to the present invention, it is possible to obtain the ink composition for oil-based ballpoint pens where the handwriting sharpness is high, there is no bleeding and no show through, and which is excellent in handwriting, feeling of writing and start of writing, and is chemically stable. Therefore, the present invention can be effectively utilized as the ink for oil-based ballpoint pens. The ballpoint pen using the ink composition for oil-based ballpoint pens of the invention exerts the excellent performance, and is widely available as the ballpoint pen.

The invention claimed is:

1. An ink composition for an oil-based ballpoint pen comprising: an oil-soluble dye, water, an organic solvent whose vapor pressure at 20° C. is 0.5 minHg or more and which dissolves the water, and an organic solvent whose vapor pressure at 20° C. is 0.1 mmHg or less and which dissolves the organic solvent whose vapor pressure at 20° C. is 0.5 mmHg or more, wherein a total of the water, the organic solvent whose vapor pressure at 20° C. is 0.5 mmHg or more and which dissolves the water, and the organic solvent whose vapor pressure at 20° C. is 0.1 mmHg or less and which dissolves the organic solvent whose vapor pressure at 20° C. is 0.5 mmHg or more is 20 to 75% by mass based on an entire mass of the ink composition, and a content of the water is 2.0 to 15.0% by mass based on the entire mass of the ink composition, and the ink composition contains the organic solvent whose vapor pressure at 20° C. is 0.5 mmHg or more is 3.0 to 30.0% by mass based on the entire mass of the ink composition.

2. The ink composition for the oil-based ballpoint pen as claimed in claim 1, wherein the total of the water, the organic solvent whose vapor pressure at 20° C. is 0.5 mmHg or more and which dissolves the water and the organic solvent whose vapor pressure at 20° C. is 0.1 mmHg or less and which dissolves the organic solvent whose vapor pressure at 20° C. is 0.5 mmHg or more is 35 to 65% by mass based on the entire mass of the ink composition.

3. The ink composition for the oil-based ballpoint pen as claimed in claim 1, wherein the ink composition contains the organic solvent whose vapor pressure at 20° C. is 0.1 mmHg or less of 10.0 to 40.0% by mass based on the entire mass of the ink composition.

4. The ink composition for the oil-based ballpoint pen as claimed in claim 1, wherein an ink viscosity at 20° C. is 100 to 5,000 mPa·s.

5. A method for producing an ink composition for an oil-based ballpoint pen comprising: formulating and mixing an oil-soluble dye, water, an organic solvent whose vapor pressure at 20° C. is 0.5 mmHg or more and which dissolves the water, and an organic solvent whose vapor pressure at 20° C. is 0.1 mmHg or less and which dissolves the organic solvent whose vapor pressure at 20° C. is 0.5 mmHg or more at a given ratio where each is not 0, wherein the predetermined ratio is within the range where a total of the water, the organic solvent whose vapor pressure at 20° C. is 0.5 mmHg or more and which dissolves the water, and the organic solvent whose vapor pressure at 20° C. is 0.1 mmHg or less and which dissolves the organic solvent whose vapor pressure at 20° C. is 0.5 mmHg or more is 20 to 75% by mass and the water is 2.0 to 15.0% by mass, and the ink composition contains the organic solvent whose vapor pressure at 20° C. is 0.5 mmHg or more is 3.0 to 30.0% by mass based on the entire mass of the ink composition.

6. The method for producing the ink composition for the oil-based ballpoint pen as claimed in claim 5 comprising: mixing and stirring the oil-soluble dye and the organic solvent whose vapor pressure at 20° C. is 0.1 mmHg or less and which dissolves the organic solvent whose vapor pressure at 20° C. is 0.5 mmHg or more at relatively high temperature, and thereafter mixing the water and the organic solvent whose vapor pressure at 20° C. is 0.5 mmHg or more and which dissolves the water with a resulting mixture, and stirred at relatively low temperature.

7. A ballpoint pen refill wherein an ink accommodating tube with a ballpoint pen tip at a top end is filled with the ink composition for the oil-based ballpoint pen as claimed in claim 1, a back end of the ink composition for the oil-based ballpoint pen is filled with an ink following member, and a vapor permeability at a side wall of the ink accommodating tube is 2.0 g/m²·24 hr or less at 25° C. and 90% RH.

8. A ballpoint pen refill wherein an ink accommodating tube with a ballpoint pen tip at a top end is filled with the ink composition for the oil-based ballpoint pen as claimed in claim 1, a back end of the ink composition for the oil-based ballpoint pen is filled with an ink following member, and a side wall of the ink accommodating tube is composed of a metallic material.

9. A ballpoint pen refill wherein an ink accommodating tube with a ballpoint pen tip at a top end is filled with the ink composition for the oil-based ballpoint pen as claimed in claim 1, a back end of the ink composition for the oil-based ballpoint pen is filled with an ink following member, and a side wall of the ink accommodating tube is composed of a resin material having a thickness of 50 μm or more, vapor permeability of the resin material being 2.0 gm²·24 hr or less at 25° C. and 90% RH at a thickness of 25 μm.

10. The ink composition for an oil-based ballpoint pen as claimed in claim 1, wherein the content of the water is 3.0 to 10.0% by mass based on the entire mass of the ink composition.

11. The method for producing an ink composition for an oil-based ballpoint pen as claimed in claim 5, wherein a content of the water is 3.0 to 10.0% by mass based on the entire mass of the ink composition.

* * * * *